United States Patent [19]

Rinehart

[11] Patent Number: 4,840,118
[45] Date of Patent: Jun. 20, 1989

[54] OUTDOOR GRILL WITH EXTRACTABLE FOOD SUPPORTING RACK

[76] Inventor: Homer L. Rinehart, 1603 NW. 4th St., Lindsay, Okla. 73052

[21] Appl. No.: 82,684

[22] Filed: Aug. 7, 1987

[51] Int. Cl.$^4$ ............................................. A47J 27/00
[52] U.S. Cl. ...................................... 99/446; 99/450; 99/447; 99/393; 126/25 R
[58] Field of Search ............... 126/25 R, 29, 30, 41 R; 99/444, 445, 446, 400, 425, 450, 408, 393, 392, 401, 389, 447

[56] References Cited

U.S. PATENT DOCUMENTS

| 60,281 | 12/1866 | Taylor | 312/296 |
|---|---|---|---|
| D. 183,341 | 8/1958 | Chiascione | D81/10 |
| 561,856 | 6/1896 | Baxter | 126/9 R |
| 957,748 | 5/1910 | Coppridge | 126/273 R |
| 1,751,219 | 3/1930 | Seamon | 99/450 X |
| 1,868,495 | 7/1932 | Einermann | 312/273 |
| 2,145,892 | 10/1935 | Roberts | 62/89 |
| 2,161,699 | 6/1939 | Freeman | 126/29 |
| 2,180,868 | 11/1939 | Dunning et al. | 99/444 X |
| 2,666,426 | 1/1954 | Pollard | 126/25 |
| 2,902,026 | 9/1959 | Hathorn, Jr. | 126/25 |
| 2,933,080 | 4/1960 | Adey | 126/25 |
| 3,096,706 | 7/1963 | Cardwell | 99/340 |
| 3,151,609 | 10/1964 | Hastings, Jr. | 126/25 |
| 3,193,663 | 7/1965 | Budzich | 99/401 X |
| 3,334,620 | 8/1967 | De Werth | 99/401 X |
| 3,366,035 | 1/1968 | Jones | 99/393 X |
| 3,380,444 | 4/1968 | Stalker | 126/25 |
| 3,413,911 | 12/1968 | Phelan | 99/446 X |
| 3,568,590 | 3/1971 | Grice | 99/450 X |
| 3,596,591 | 8/1971 | Spates | 126/41 R X |
| 4,474,107 | 10/1984 | Cothran | 99/389 X |
| 4,561,418 | 12/1985 | Cairns | 126/41 R |
| 4,599,938 | 7/1986 | Gongwer | 126/25 R X |

Primary Examiner—Harvey C. Hornsby
Assistant Examiner—K. O'Leary
Attorney, Agent, or Firm—Laney, Dougherty, Hessin & Beavers

[57] ABSTRACT

An outdoor grill for cooking over a bed of combustible fuel, such as charcoal, including a supporting structure having a housing mounted at the upper side thereof. The housing includes a fuel-containing base portion, and a hood which is movably mounted above the base portion so that heat and smoke from the fuel moves upwardly into the hood and can be vented therefrom. A foraminous grate or tray is slidably mounted on tracks positioned between the upper portion of the base and the lower portion of the hood for supporting food to be cooked over the fuel. The grate or tray can be reciprocated on tracks to a position facilitating smoke-free inspection of the food by pulling the food-supporting tray horizontally outwardly from the interior of the housing.

21 Claims, 2 Drawing Sheets

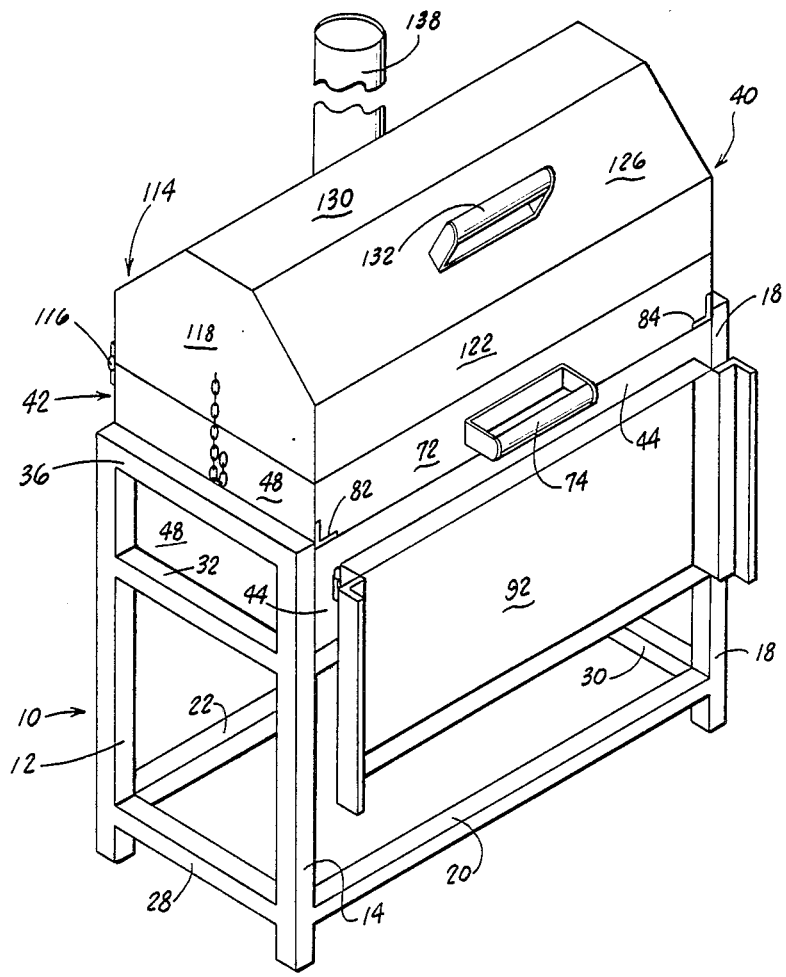
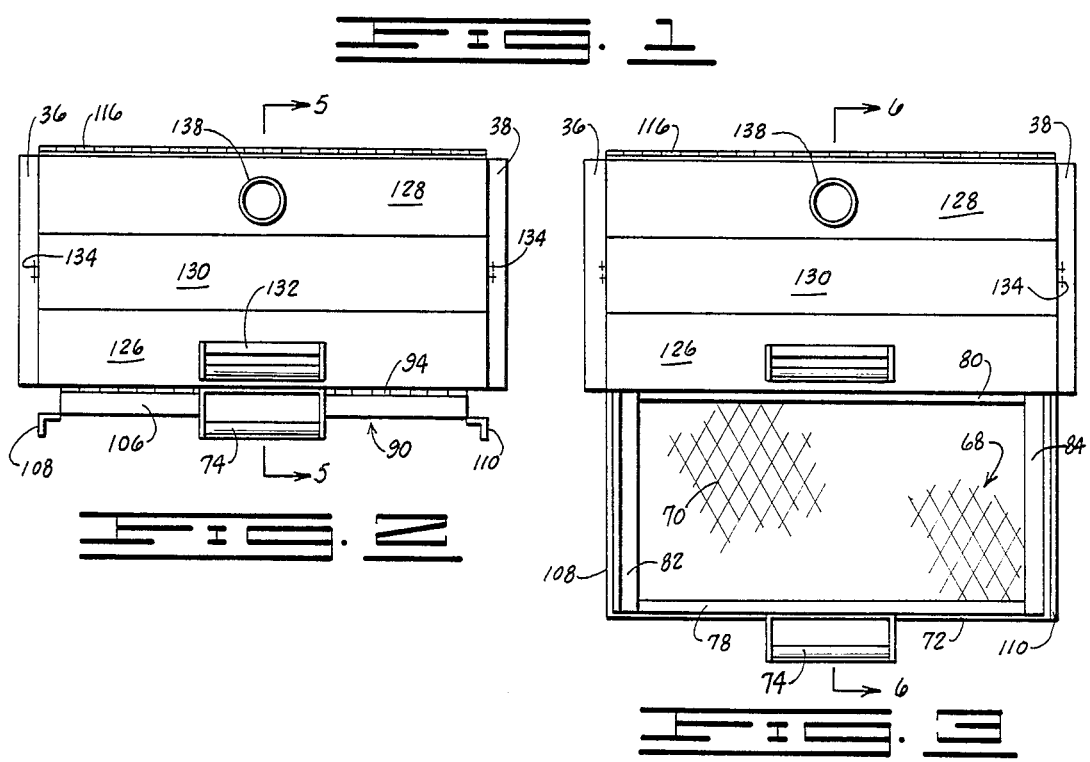

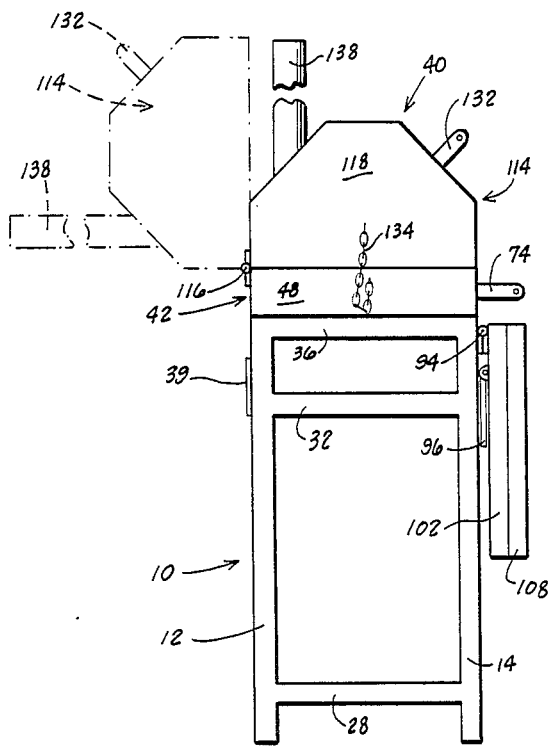
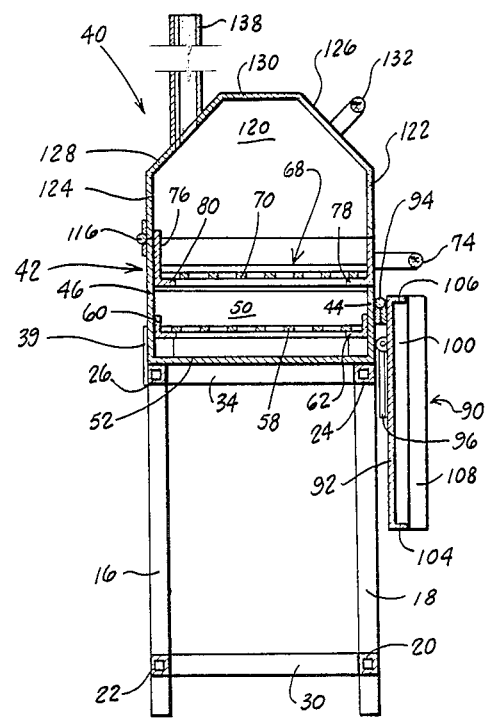
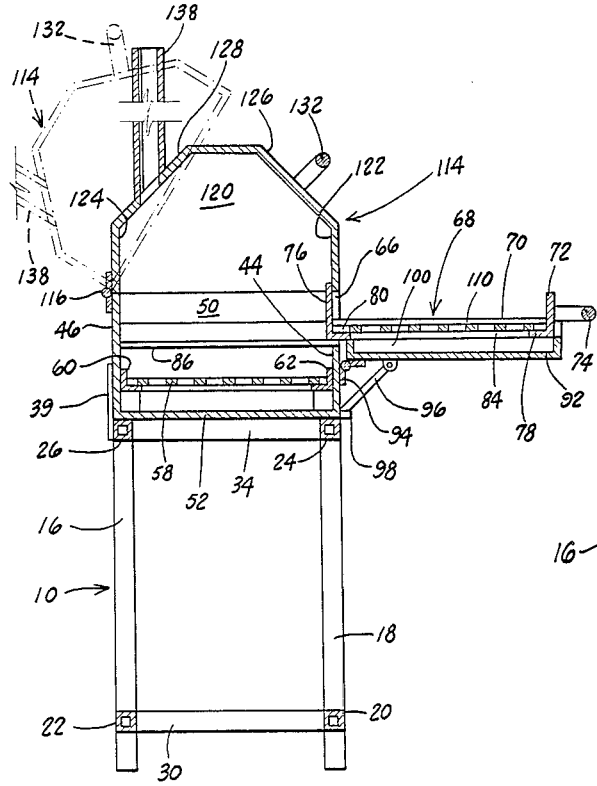
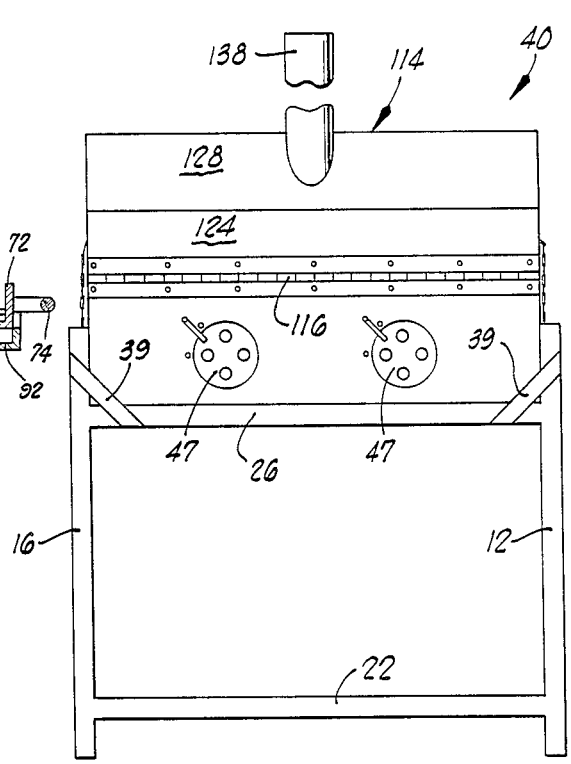

OUTDOOR GRILL WITH EXTRACTABLE FOOD SUPPORTING RACK

BACKGROUND OF THE INVENTION

1. Field of the Invention

This invention relates to outdoor grills and cooking structures for barbecuing, broiling and other types of cooking over solid or liquid combustible fuels located in the lower portion of a housing, and functioning to heat and cook meat or other foods supported on a foraminous grill or grate above the fuel.

2. Brief Description of the Prior Art

As outdoor smokers, barbecue grills and the like are presently constructed, they generally include a housing which will contain in a lower portion thereof, a grate, plate, pan or other supporting structure upon which the charcoal briquettes or other fuel is supported. Above this at some location, an expanded metal or foraminous grill, grate or rack is used to support steaks or other food to be cooked over the fuel. There is then often provided a dome or hood which can be lifted up or pivoted to an open position to permit the cook to have access to the food for purposes of inspection, or to baste the food, or the like. Usually, at this time, the food remains in the same position over the fuel, with the result that the hot combustion gases from the fuel waft upwardly and strike the face of the cook, and often render the environs of the outdoor smoker or grill uncomfortable to bystanders. Moreover, the smoke, which in some forms of cooking, or when using some types of fuel may be voluminous, billows upwardly into the face of the chef, and has as its only redeeming feature, the discouragement of close-at-hand kibitzers, without whom the cook might be more at ease.

In indoor cooking facilities and food containment devices, it is often a feature that a pull out shelf or drawer or grill is provided so that the food can be pulled out of the interior of a housing and inspected, or retrieved, or turned. A structure of this general type is illustrated and described in Taylor U.S. Pat. No. 60,281 which depicts a refrigerator in which a food-supporting drawer is provided, which drawer can be pulled out of the refrigerator so as to position a vertically extending back plate or wall across the opening into the refrigerator housing. The cold air inside the refrigerator will not escape when the drawer is pulled out all the way to the food-retrieval position.

Raymond U.S. Pat. No. 2,161,669 shows a portable broiler having a pull out ash drawer over which fuel is mounted, with the fuel-supporting grate disposed below a food-supporting grate or grill at the upper side of the broiler. This ash drawer moves on tracks constituted by angle iron strips, and carries a large, vertically extending, front wall or plate which closes an opening into the broiler at the time that the ash drawer is pushed all the way into the main housing of the broiler.

A similar ash drawer is depicted and described in Addy U.S. Pat. No. 2,933,080. In the Addy patent, a housing is mounted on the upper side of a framework or standard and includes a food-supporting grill located over the ash drawer. A dome or hood is mounted over this food-supporting grill. The food-supporting grill is not movable, from all indications, except possibly upwardly.

Cardwell U.S. Pat. No. 3,096,706 shows of a charcoal-retaining grid which is removable from the inside of a housing. The grid is slidably retained on rails. This system also has a food pan which has handles and can be pulled outwardly upon supporting rails by means of an outwardly projecting handle.

Hastings U.S. Pat. No. 3,151,609 includes a pair of trays which can be slid horizontally into and out of a charcoal cooker housing. The firebox which supports the charcoal does not appear to be removable from this housing, and it is positioned at an elevation within the charcoal cooker housing which is higher than the trays which are removable, thus indicating that such trays are in actuality ash drawers. A spit or grate is used for supporting the food so as to expose it to a source of heat located therebelow in the firebox within the charcoal cooker housing. This grate appears to be removable only by vertically lifting the tray up, after a dome or hood has been pivoted upwardly about a hinge connecting it to the base portion of the housing.

Stalker U.S. Pat. No. 3,380,444 illustrates a transportable cooking apparatus which includes a drawer used for containing or supporting charcoal briquettes. This drawer has a handle which enables it to be pulled horizontally outwardly on rails or tracks when it is desired to replenish or remove the charcoal. A grill or grate can be placed in position over the charcoal drawer for supporting food to be cooked, but this grill cannot be slidably removed from the cooker housing. A hood or dome is hingedly connected to a base portion of the housing for pivotation about a horizontal axis, and its upward movement is limited by a chain which interconnects the hood to the base portion of the housing.

Coppridge U.S. Pat. No. 957,748 depicts a baking stove of early vintage in which a plurality of drawers are provided at locations over the source of heat which is disposed near the bottom of the stove housing. Although some drawers located upwardly within the housing can be pulled out by means of handles protruding on the outer side of the housing, it appears that the heat which originates in the bottom of the housing is vented into the center of the housing, or to the sides of the housing, rather than being passed upwardly through any type of foraminous grill or support for the food. Moreover, this baking stove is intended for interior use rather than exterior or outdoor use.

Other patents of the type dealing with refrigerator constructions disclose the concept of providing slide out food-supporting drawers which include a back side flange or vertically extending wall which is dimensioned to seal the opening into the housing of the refrigerator so that the cold air inside the refrigerator does not escape when the drawers are open. In general, the prior art described above, and known to Applicant, is not thought to include, in an outdoor smoker and grill, a housing which is adapted for implacement of fuel in the lower portion of the housing, with a grill or foraminous-type, food-supporting rack assembly slidably mounted for horizontal sliding movement in that housing, so that the food-supporting rack can be pulled out of that housing without interruption of venting of hot combustion gases and smoke to the atmosphere through a regular dome or hood.

GENERAL DESCRIPTION OF THE PRESENT INVENTION

The present invention provides an outdoor cooking grill upon which food can be quickly and flavorfully cooked, with an opportunity afforded by the construction of the grill for the chef or cook to frequently inspect the food being cooked without being subjected to exposure to hot combustion gases from the fuel being used to cook the food, or from blinding smoke emanating from within the housing used to contain the food and the fuel.

Broadly described, the outdoor cooking grill of the present invention includes a stand or support frame upon which a housing can be permanently or detachably mounted and supported. The housing, as thus supported at the upper side of the standard or support frame, includes a base portion, in which the food to be cooked and the fuel are located, and a hood which is hingedly connected to the base portion. The fuel is supported upon a foraminous or perforated member within the base portion, and the food is supported upon an extractable or sliding foraminous rack assembly. The food-supporting rack assembly can be pulled horizontally out of the housing through an opening just large enough to accommodate the food-supporting rack, and formed in one side of the housing beneath the hood. When the food-supporting rack is pulled out of the housing through the opening, it slides out onto a drip pan assembly which extends horizontally from one side of the base portion of the housing and carries tracks functioning to slidably support the food-supporting assembly. The food-supporting rack includes a relatively large wall or plate at one side thereof which is sized to close the opening in the housing when the food-supporting rack is pulled outwardly. As the food-supporting rack is moved to its outer position upon the drip pan assembly, the food carried thereon is exposed to view and can be easily inspected, manipulated and treated by the chef. At the same time, the opening through which the food-supporting assembly has been moved outwardly is closed by the plate or wall carried at the back of this assembly, so that no smoke or heat can be vented through this opening to interfere with the cook's inspection of the food, or his cooking operations.

An important object of the invention is to provide an outdoor cooking grill which can be used in a way which permits the cook to inspect and treat, or manipulate, the food being cooked without interference from smoke or heat. This capability results from a novel feature by which the food can be removed from a closed housing in an easy fashion, and immediately positioned at a location where the cook or chef can see the food, can turn it and can treat it.

Another object of the invention is to provide an outdoor grill or cooking unit which includes a fuel-containing base portion, a hood pivotally connected to this base portion and a reciprocating food-supporting rack which can be pulled through a specifically-sized and configured opening in one side of the base portion so that when the food-supporting assembly is pulled outwardly to a position where the food is exposed to view and manipulation by the cook, this opening in the side of the base portion of the housing is automatically completely closed to prevent smoke and heat from passing therethrough.

Additional objects and advantages will become apparent as the following detailed description is read in conjunction with the accompanying drawings which illustrate a preferred embodiment of the invention.

GENERAL DESCRIPTION OF THE DRAWINGS

FIG. 1 is a perspective view illustrating an outdoor grill constructed in accordance with the present invention.

FIG. 2 is a plan view of the outdoor grill depicted in FIG. 1 and showing the appearance of the grill at a time when the extractable food-supporting rack is in the housed, cooking position in which the food carried thereon is positioned over fuel within the housing of the grill.

FIG. 3 is a plan view similar to FIG. 3, but illustrating the outdoor grill at a time when the extractable food-supporting tray has been extracted from the housing so as to access the food carried thereon for purposes of inspection and turning, basting or the like, by the chef.

FIG. 4 is an end elevation view showing the outdoor grill of the invention as it appears when viewed from one end of the grill, and with the extractable food-supporting rack disposed therewithin the housing and over the fuel located therewithin.

FIG. 5 is a sectional view taken along line 5—5 of FIG. 2.

FIG. 6 is a sectional view taken along line 6—6 of FIG. 3.

FIG. 7 is a rear elevation view illustrating the outdoor grill of the invention as it appears when viewed from the rear side of the grill.

DETAILED DESCRIPTION OF A PREFERRED EMBODIMENT OF THE INVENTION

Referring now to the drawings, and particularly to FIG. 1, the outdoor grill of the invention includes a support frame or standard, designated generally by reference numeral 10, and having a plurality of vertically extending, substantially parallel legs 12, 14, 16 and 18 disposed at the four corners of support frame.

The vertically extending legs 12–18 of the support frame 10 are interconnected by upper and lower pairs of elongated, horizontally extending front and rear brace elements. The lower pair of horizontally extending front and rear brace elements includes front brace element 20 and rear brace element 22. The upper pair of horizontally extending front and rear brace elements includes front brace element and rear brace element, 24 and 26, respectively. These brace elements are illustrated in section in FIGS. 5 and 6. The vertically extending parallel legs 12–18 are also interconnected by a lower pair of relatively short, parallel, transverse front-to-rear brace elements 28 and 30, and by an intermediate pair of parallel, front-to-rear transverse brace elements 32 and 34. At the top of the several vertically extending parallel legs 12–18, a pair of top transversely extending, parallel front-to-rear brace elements 36 and 38 are located as shown in FIGS. 1–4. The brace elements 36 and 38 function, with the vertically extending legs, to confine and limit horizontal movement of certain portions of the housing of the outdoor grill as hereinafter described. Horizontal movement of the housing is also limited by a pair of diagonal braces 39 which extend diagonally between the vertical leg 12 and the brace element 26 and between the vertical leg 16 and the brace 26 at the rear side of the grill.

The outdoor grill further includes a housing, designated generally by reference numeral 40, supported at the upper side of the supporting frame 10 upon the horizontally extending frame members 24 and 26 as illustrated in FIGS. 1 and 4. The housing 40 includes a fuel-containing base portion 42 which rests upon the horizontally extending brace members 24 and 26, and which is of generally right parallelepiped configuration. The housing base portion 42 thus includes opposed, parallel, vertically extending front and rear walls 44 and 46, and a pair of opposed, parallel, vertically extending end walls 48 and 50. A pair of variable air-admission damper openings 47 are provided in the vertically extending back wall 46 to allow the draft of air into the interior of the housing 40 and across the fuel to be controlled as desired. The vertically extending front and rear walls 44 and 46, and the end walls 48 and 50 are interconnected at their lower edges by a horizontally extending bottom wall 52 which is in contact with, and rests upon, the horizontally extending, front-to-rear brace members 24 and 26 of the support frame 10.

A fuel-supporting grate 58 is mounted upon horizontally extending angle irons 60 and 62 which are secured in the illustrated location to the vertically extending, parallel front and rear walls 44 and 46, and extend substantially parallel to each other in a common horizontal plane as illustrated in FIG. 5. The fuel-supporting grate 58 can be an expanded metal element, or other suitable perforated rigid structure which is capable of supporting lumps of charcoal, or other types of fuel used to provide cooking heat in outdoor grills. The grate 58 extends between the parallel, vertically extending end walls 48 and 50, as well as between the vertically extending front and back housing walls 44 and 46. In resting upon angle iron elements 60 and 62 secured to the walls, the fuel-supporting grate 58 can be easily lifted out of the base portion 42 of the housing 40 at a time when the hood portion of the housing, hereinafter described, is opened to provide vertical clearance above the grate.

The vertically extending forward wall 44 of the base portion 42 of the housing 40 extends vertically for a shorter distance than does the vertically extending back wall 46 of the housing. There is thus provided a space or opening 66 above the vertically extending front wall 44 (see FIG. 6) which will accommodate a slidably mounted, food-supporting perforated or foraminous rack or grate assembly, designated generally by reference numeral 68.

The food-supporting grate assembly 68 includes a drawer having an open bottom across which a perforated or foraminous grate or rack 70 extends. The drawer includes a vertically extending front outer drawer plate or wall 72, to which a handle 74 is centrally attached. The drawer also includes a vertically extending, rear, internal drawer plate or wall 76 which, at all times during the use of the outdoor grill remains inside the housing 40, and is wider and longer than the opening 66 as shown in FIG. 6. The food-supporting grate 70 rests at its four outer peripheral edges upon a pair of parallel, horizontally extending coplanar forward and rear drawer flanges 78 and 80, respectively, and a pair of parallel, horizontally extending coplanar side drawer flanges 82 and 84. The flanges 82 and 84 project between the front and rear drawer walls, 72 and 76, respectively, of the open-bottomed drawer forming a part of the grate assembly 68.

It will be noted that the front wall 72 is precisely the same size as the opening 66, while the rear wall 76 is slightly wider and longer than the width and length of the opening 66, and thus functions as a stop at a time when the food-supporting grate assembly 68 is slidingly reciprocated outwardly to the position shown in FIG. 6. This status of the outdoor grill of the invention will be hereinafter explained in greater detail.

The food-supporting perforated rack assembly 68 undergoes sliding movement by having the side drawer flanges 82 and 84 supported upon a pair of spaced, horizontally extending, parallel, angle iron internal tracks 86 and 88 secured to the opposite, parallel end walls 48 and 50 of the base portion 42 of the housing 40.

In order to permit the food-supporting rack assembly 68 to be moved out of the housing 40 to a position where food supported thereon can be viewed and turned or treated, a drip pan assembly 90 is pivotally secured on the forward side of the housing 40. More specifically, the drip pan assembly 90 includes a flat pan 92 of rectangular configuration which has a rear edge secured by the hinge 94 to the vertically extending forward wall 44 of the base portion 42 of the housing 40 for pivotation about a horizontal axis.

A stop shaft 96 is pivotally secured to the under side of the flat pan 92 at a location spaced forwardly from the rear edge thereof. The stop shaft 96 is mounted for pivotation about a horizontal axis so that it can swing between the inoperative position, shown in FIG. 5, and the pan-supporting position illustrated in FIG. 6. In the pan-supporting position, the stop shaft 96 is pivoted inwardly until its free end, opposite its end pivotally connected to the pan 92, bears against a stop rib 98 secured to the outer side of the housing 40 near the lower side thereof. In this position, the stop shaft 96 will support the pan 92 in the illustrated horizontally extending position so that this pan, as a portion of the folding pan assembly, can be positioned beneath the food carried on the food-supporting rack assembly 68, and can catch grease or drippings from the food at this time when the food-supporting rack assembly 68 is pulled outwardly from the housing 40.

The folding drip pan assembly 90 further includes a pair of opposed, substantially parallel side plates 100 and 102 which are secured to the opposite side edges of the pan 92, and which function with the parallel front and rear plates 104 and 106, respectively, as the latter are secured to the forward and rear edges of the pan 92, to form a confining structure to retain grease, juices, seasoning and the like which fall onto the pan 92. Welded or otherwise suitably secured to the upper edges of the parallel side plates 100 and 102 are a pair of angle irons which form lateral, substantially parallel external tracks 108 and 110 upon which the food-supporting rack assembly 68 can slide when it is pulled out of the housing 40 to the external position depicted in FIG. 6. It will be recalled that the extent to which the food-supporting rack assembly 68 can move out of the housing 40 in a horizontal direction is limited by the arresting contact of the rear wall 76 with the front wall of a hood portion 114 of the housing 40, to be hereinafter described in greater detail. This relationship is illustrated in FIG. 6. This limitation of movement of the food-supporting rack assembly 68 assures that the foraminous grate or rack 70 upon which the food is supported will be located over the pan 92 at a time when the food-supporting rack assembly is pulled all of the way out of the housing 40 to the position illustrated in FIG. 6 of the drawings.

The upper portion of the housing 40 is made up of a large dome or hood designated generally by reference numeral 114. The rear, lower edge of the hood 114 is hinged to the upper edge of the vertically extending back wall 46 of the base portion 42 of the housing 40. This hinged-connection is best illustrated in FIGS. 1, 2 and 4 where the hinge 116 by which the hood 114 is joined to the base portion 42 can be clearly perceived. The two extreme positions of the hood 114 can also be seen in FIGS. 4 and 6 where the open position of the hood is illustrated in dashed lines, and the cooking position of the hood is shown in full lines. The upward pivoting movement of the hood is limited by a chain connected between the hood 114 and the base 42 of the housing 40.

The hood 114 includes a pair of vertically extending end walls 118 and 120. A pair of vertically extending front and back walls 122 and 124 interconnect the lower portions of the end walls 118 and 120. It is the lower edge portion of the vertically extending back wall 124 which is connected by the hinge 116 to the vertically extending back wall 46 of the base portion 42 of the housing 40.

The hood 114 further includes a pair of convergent, inclined walls 126 and 128 and a horizontally extending top wall 130 which projects between and interconnects the walls 126 and 128. Secured to the inclined wall 126 is a handle 132 which can be used for pivoting the hood 114 to an open position as shown in dash lines in FIG. 6. In order to limit the movement of the hood upwardly to the dash line position shown in FIG. 6, a flexible chain 134 interconnects the hood 114 and the base portion 42 of the housing 40 in the manner shown in FIG. 4. In order to vent hot combustion gases from the fuel in the housing 40, a tube or pipe-type stack 138 extends upwardly from the wall 128.

In the use of the outdoor cooking grill of the invention, the housing 40 is first seated upon the upper side of the supporting frame or standard 10 in the manner illustrated. The housing 40 can be fixed to the top of the standard, or it can be removable therefrom. After the housing is mounted in its operative position on top of the standard 10, the hood 114 is pivoted to its open position to provide access to the interior of the housing 40. At this time, the food-supporting foraminous rack assembly 68 is either lifted out of the base portion 42 of the housing 40, or it is reciprocated or slid outwardly onto the drip pan assembly 90 in a manner which will hereinafter be described. In either event, the upper side of the fuel-supporting grate 64 is then exposed, and pellets of charcoal or other fuel can be placed thereon. Placement of the fuel on the fuel-supporting grate 64 permits air to be passed upwardly through the fuel to maintain combustion at a time when the hood 114 is closed. The air passes through the variable damper openings 47 which are formed in the vertically extending back wall 46 of the base portion 42 of the housing 40.

After the fuel is ignited and is developing the necessary heat for cooking within the housing 40, the hood 40 may then again be opened to permit the food-supporting rack assembly 68 to be placed within the base portion 42 of the housing 40 by resting the parallel side wall flanges 82 and 84 upon the tracks 86 and 88 secured to the inner sides of the parallel end walls 48 and 50 of the base portion 42 of the housing 40. Alternatively, if the hood 114 has been closed, and the food-supporting rack assembly 68 has been pulled out and is resting upon the drip pan assembly 90 which is elevated to its operative position, the food-supporting rack assembly 68 can then be slid inwardly to its operative, cooking position over the fuel-supporting grate 58. This is accomplished by pushing inwardly on the handle 74 to push the rack assembly 68 off of the parallel external tracks 108 and 110 of the drip pan assembly 90, and then onto the internal tracks 86 and 88 on the base portion 42 of the housing 40. When the food-supporting rack assembly 68 has been pushed into the housing 40 in the manner described, the wall 72 will completely close the opening 66 formed in the forward wall 44 of the fuel-receiving base portion 42. Thus, at this time, none of the heat within the housing 40 can escape through the opening 66, but the hot gases can only be vented through the exhaust pipe 138.

With the hood 114 closed, the food-supporting rack assembly 68, having the steaks or other food thereon, is in its cooking position within the housing in which it rests upon the tracks 86 and 88. The front wall of the assembly 72 closes the opening 66 at this time. Cooking is allowed to proceed until it is thought desirable to inspect the food carried on the food-supporting rack assembly 68 to see the extent to which it has been cooked. In order to do this, the food-supporting rack assembly 68 is again extricated from the housing 40 by pulling upon the handle 74. Prior to this time, however, it may have been desirable to collapse or pivot the drip pan assembly 90 to its downwardly extending position as shown in FIGS. 4 and 5. Whatever may have been the previous status of the drip pan assembly 90, at the time when it is desired to slide the food-supporting rack assembly 68 outwardly upon the drip pan assembly, the drip pan assembly is then pivoted upwardly and latched in the illustrated horizontally extending position. This latching is accomplished by engaging the stop shaft 96 with the stop rib 98. This locks the drip pan assembly 90 in the horizontally extending position where the food-supporting rack assembly 68 can be pulled out to the food inspection position depicted in FIGS. 3 and 6. At this time, any juices which drip downwardly from the food are caught upon the flat drip pan 92.

With the food in this position upon the food-supporting rack assembly 68, the meat or other food may be basted, or a seasoning applied, or the food may be turned over to cook on the opposite side, or any number of manipulations or treatments may be carried out. It is very important to note that at this time, while the chef is working with the food on the foraminous grate or grill 70 of the food-supporting rack assembly 68, the rear wall 76 of the rack assembly is pulled up to the position shown in FIG. 6, where it completely blocks the opening 66 through the base portion 42 of the housing 40. Thus, smoke and heat cannot be vented through the opening 66 into the face of the cook or bystanders, but the smoke and heat continue to be vented to the atmosphere through the tubular stack or pipe 138.

The ability to inspect and treat the food being cooked on the outdoor grill without exposing the chef and bystanders to a blast of heat resulting from opening the hood 114, or in some other way permitting smoke and heat to be directed toward the cook and the bystanders is an important feature of the present invention. When the food-supporting rack assembly 68 is pulled outwardly as shown in FIGS. 3 and 6, the cook can inspect the food and treat it without being exposed to a blast of heat or smoke passing through the opening 66. It should also be noted that this feature of the invention permits additional fuel to be placed on the fuel-supporting grate 58 at a time when the food-supporting rack 68 and the food carried thereon is pulled outwardly to the position shown in FIG. 6, and the hood 114 is then lifted upwardly to give full and complete exposure of the fuel-supporting grate 64 from above.

Although a preferred embodiment of the invention has been herein described in order to illustrate the principles which underlie the invention, it will be understood that changes and innovations can be made in the illustrated and described embodiment of the invention without departure from these principles. Changes and innovations of this type are therefore deemed to be circumscribed by the spirit and scope of the invention, except as the same may be necessarily limited by the appended claims or reasonable equivalents thereof.

What is claimed is:

1. An outdoor grill comprising:
   a vertically extending standard;
   a housing mounted at the top of said standard and including:
      a fuel-containing base portion; and
      a hood having a lower edge and being hingedly connected to said base portion for pivotation about a horizontal pivotal axis from a first, closed position to an open position;
   a fuel-supporting grate vertically removably positioned in the lower portion of said housing in said base portion for supporting a combustible fuel;
   a foraminous food-supporting rack assembly horizontally reciprocably mounted in said base portion of said housing above said fuel-supporting grate;
   an opening in one side of the base portion of said housing through which said food-supporting rack assembly can be pulled directly outwardly in horizontal reciprocation for purposes of removing the food on the food-supporting rack assembly from the interior of the housing; and
   a drip pan assembly pivotally secured to a side of the base portion of said housing for pivotation about a horizontal axis located adjacent the opening into the base portion of said housing, said drip pan assembly including:
      a pan having confining flanges extending around the outer perimeter thereof; and
      track means secured to said flanges for movably supporting said food-supporting rack assembly when said food-supporting rack assembly is extricated from said housing by movement horizontally through said opening in the base portion of said housing from the interior of the housing to the exterior thereof to a position over said drip pan assembly and at rest upon said track means.

2. An outdoor grill as defined in claim 1 wherein said drip pan assembly is pivotally secured to the base portion of said housing adjacent the opening in said base portion for pivotation about a horizontal axis from a folded down, inoperative position, in which the drip pan extends in a substantially vertical plane, to a folded out, horizontally extending operative position in alignment with the opening through the base portion of said housing.

3. An outdoor grill as defined in claim 2 and further characterized as including a pair of parallel, horizontally extending tracks secured to opposite walls of said base portion on the inner side of said housing and in substantially coplanar alignment with said track means included in said drip pan assembly.

4. An outdoor grill as defined in claim 2 wherein said food-supporting rack assembly includes:
   a foraminous grate for supporting food;
   a vertically extending front wall along one side of said grate and positioned to occupy substantially all of the opening into said base portion of said housing when said food-supporting rack assembly is positioned in the cooking position inside said base portion;
   a handle secured to said vertically extending front wall and projecting outwardly from the base portion of said housing on the outer side thereof; and
   a vertically extending back wall spaced horizontally from said vertically extending front wall and disposed on the opposite side of said food-supporting grate from said vertically extending front wall, said vertically extending back wall having a transverse width in the vertical direction which is greater than the width of the opening into the base portion of said housing, as measured in a vertical direction, whereby said vertically extending back wall cannot pass through said opening and said back wall functions to arrest the movement of said food-supporting rack assembly in a direction of movement out of said housing as said food-supporting rack assembly is moved from a cooking position to a food inspection position.

5. An outdoor grill as defined in claim 2 wherein said vertically extending standard comprises:
   vertically extending parallel legs;
   first horizontally extending brace elements extending beneath and removably supporting said housing; and
   additional horizontally extending brace elements laterally confining said housing and limiting the horizontal movement of said housing.

6. An outdoor grill as defined in claim 1 wherein the base portion of said housing has a pair of parallel, horizontally extending tracks secured to opposite walls of said base portion and supporting said foraminous food-supporting rack assembly for sliding movement on said tracks.

7. An outdoor grill as defined in claim 6 where said food-supporting rack assembly includes:
   a foraminous food-supporting grate of generally rectangular configuration; and
   a pair of substantially parallel, horizontally extending flanges supporting opposite side edge portions of said foraminous food-supporting grate and permitting said food-supporting grate to be lifted upwardly to remove the grate from said flanges and from said food-supporting rack assembly.

8. An outdoor grill as defined in claim 1 wherein said food-supporting rack assembly includes:
   a foraminous grate for supporting food;
   a vertically extending front wall along one side of said grate and positioned to occupy substantially all of the opening into said base portion of said housing when said food-supporting rack assembly is positioned in the cooking position inside said base portion;

9. An outdoor grill as defined in claim 8 wherein said drip pan assembly further includes a stop shaft, and said outdoor grill further includes stop means carried thereon and cooperating with said stop shaft to support said drip pan assembly in a horizontally extending position.

10. An outdoor grill as defined in claim 9 wherein said drip pan assembly further includes a stop shaft, and said outdoor grill further includes stop means carried thereon and cooperating with said stop shaft to support said drip pan assembly in a horizontally extending position.

11. An outdoor grill as defined in claim 1 wherein said food-supporting rack assembly includes:
   a foraminous food-supporting grate of generally rectangular configuration; and a pair of substantially parallel, horizontally extending flanges supporting opposite side edge portions of said foraminous food-supporting grate and permitting said food-supporting grate to be lifted upwardly to remove the food-supporting grate from said flanges and from said food-supporting rack assembly when said hood is opened.

12. An outdoor grill as defined in claim 1 wherein said vertically extending standard comprises:
vertically extending parallel legs;
first horizontally extending brace elements extending beneath and removably supporting said housing; and
additional horizontally extending brace elements laterally confining said housing and limiting the horizontal movement of said housing.

13. An outdoor grill as defined in claim 12 and further characterized as including a pair of parallel, horizontally extending tracks secured to opposite walls of said base portion on the inner side of said housing and in substantially coplanar alignment with said track means included in said drip pan assembly.

14. An outdoor grill as defined in claim 1 wherein said drip pan assembly further includes a stop shaft, and said outdoor grill further includes stop means carried thereon and cooperating with said stop shaft to support said drip pan assembly in a horizontally extending position.

15. An outdoor grill as defined in claim 1 wherein said food-supporting rack assembly is of generally rectangular overall configuration and includes:
a vertically extending front wall along one side thereof of substantially the same size and shape as said opening in one side of said base portion;
a handle secured to said front wall for pulling said rack out of said housing; and
a vertically extending back wall of larger size than said opening and extending parallel to said front wall and located at the opposite side of said rack assembly from said front wall, said back wall being dimensioned and configured to close said opening in said base portion when said rack is pulled out of said housing.

16. A pull out shelf-type grill and smoker comprising:
a housing having an opening in one side thereof;
means for supporting fuel in the lower portion of the housing;
means for venting smoke from the upper portion of said housing;
a food-supporting rack assembly positioned in said housing and aligned with said opening for reciprocating movement into and out of said housing through said opening, said food-supporting rack assembly including a wall plate at one side thereof of a size, shape and location to close said opening in the housing when all of said rack assembly, except said wall plate, is moved through said opening to the outside of said housing to prevent smoke and heat from passing through the opening; and
a drip pan assembly pivotally secured to the housing at a location adjacent said opening, said drip pan assembly being pivotable between an inoperative position, in which the drip pan assembly extends alongside said housing, to an operative, food inspection position in which said drip pan assembly extends substantially horizontally outwardly from said housing, said drip pan assembly including a pair of spaced, horizontally extending, parallel tracks aligned with said opening when the drip pan assembly is in its operative, food inspection position for slidably receiving said food-supporting rack assembly when said food-supporting rack assembly is moved outwardly through said opening in a horizontal movement to place all of the food-supporting rack assembly outside of said housing except said wall plate.

17. A pull out shelf-type grill and smoker as defined in claim 16 and further characterized as including means for admitting air to the lower portion of said housing to supply oxygen to fuel supported in the lower portion of said housing.

18. A pull out shelf-type grill as defined in claim 17 wherein said food-supporting rack assembly is further characterized as including:
a front wall plate extending parallel to, and spaced from, said first mentioned wall plate and dimensioned to close said opening defined by the housing at a time when the food-supporting rack assembly is in its internal position within said housing; and
a handle attached to said front wall plate to permit said food-supporting rack assembly to be moved outwardly through the opening in said housing to a position over and supported upon said drip pan assembly.

19. A pull out shelf-type grill and smoker as defined in claim 16 and further characterized as including pull out means secured to said food-supporting rack assembly for permitting manual, horizontal reciprocating and sliding movement of said food-supporting rack assembly to move said food-supporting rack assembly in and out of said housing through said opening.

20. A pull out shelf-type grill as defined in claim 16 wherein said food-supporting rack assembly is further characterized as including:
a front wall plate extending parallel to, and spaced from, said first mentioned wall plate and dimensioned to close said opening defined by the housing at a time when the food-supporting rack assembly is in its internal position within said housing; and
a handle attached to said front wall plate to permit said food-supporting rack assembly to be moved outwardly through the opening in said housing to a position over and supported upon said drip pan assembly.

21. An outdoor grill comprising:
a vertically extending standard;
a hollow housing mounted at the top of said standard and including:
a fuel-containing base portion having an upper side which is open at a top edge, and which has an open topped, vertically extending lateral opening formed in one side of said base portion adjacent the top edge thereof; and
a hood having a lower edge adjacent, and cooperating with the upper edge of said base portion, said hood being hingedly connected to said base portion at one side thereof for pivotation about a horizontal axis between an open position, and a closed position in which said lower edge of the hood forms an upper boundary of said lateral opening in said base portion, and extends across the open top of said opening;
a fuel-supporting grate vertically removably positioned in the lower portion of said housing in said base portion for supporting a combustible fuel, said fuel-supporting grate being removable upwardly through the opening in the upper side of the base portion at a time when said hood is pivoted to said open position;

a foraminous food-supporting rack assembly horizontally reciprocably mounted in said base portion of said housing above said fuel-supporting grate and aligned with said lateral opening in said housing base portion so that said food-supporting rack assembly can be pulled outwardly in a horizontal reciprocating motion for purposes of removing the food on the food-supporting rack assembly from the interior of the housing when said rack assembly is reciprocated through the opening to the outer side of said housing, said food-supporting rack assembly comprising:

a foraminous grate for supporting food;

a vertically extending front wall along one side of said foraminous grate and positioned to close substantially all of said lateral opening into said base portion of said housing when said food-supporting rack assembly is positioned in the cooking position inside said base portion and above said fuel-supporting grate;

a handle secured to said vertically extending front wall and projecting outwardly from the base portion of said housing on the outer side thereof; and a vertically extending back wall spaced horizontally from, and extending parallel to, said vertically extending front wall and disposed on the opposite side of said food-supporting rack assembly from said vertically extending front wall, said vertically extending back wall having a transverse width in the vertical direction which is greater than the width of the vertically extending lateral opening into the base portion in said housing so that said vertically extending back wall will not pass through said opening when said hood is in the closed position with the lower edge of said hood forming the top side of said opening, and wherein said back wall thus functions to arrest the movement of said food-supporting rack assembly in a horizontal direction of movement out of said housing as said food-supporting rack assembly is moved from an internal cooking position to an outside-the-housing food inspection position in which said vertically extending back wall contacts the lower edge of said hood on the inner side of said hood, said back wall thus closing the opening in the base portion of said housing to prevent smoke and heat from passing out of the opening in said housing when said food-supporting grate is on the outer side of the housing to permit manipulation of the food thereon, while nevertheless permitting smoke and heat to pass upwardly into the closed hood at this time, said food-supporting rack being removable from the base portion of the housing completely at a time when the hood is pivoted upwardly to its open position, whereby, at that time, after said foraminous food-supporting grate has been reciprocated through the opening to a position outside of the base portion of the housing, said fuel-supporting grate can be vertically lifted upwardly to remove the same from the open upper side of said base portion and through the opened hood.

* * * * *

UNITED STATES PATENT AND TRADEMARK OFFICE
CERTIFICATE OF CORRECTION

PATENT NO. : 4,840,118
DATED : June 20, 1989
INVENTOR(S) : Homer L. Rinehart

It is certified that error appears in the above-identified patent and that said Letters Patent is hereby corrected as shown below:

In the Claims:
Column 10, after line 52, insert the following:

-a handle secured to said vertically extending front wall and projecting outwardly from the base portion of said housing on the outer side thereof; and a vertically extending back wall spaced horizontally from said vertically extending front wall and disposed on the opposite side of said food-supporting grate from said vertically extending front wall, said vertically extending back wall having a transverse width in the vertical direction which is greater than the width of the opening into the base portion of said housing, as measured in a vertical direction, whereby said vertically extending back wall cannot pass through said opening, and said back wall functions to arrest the movement of said food-supporting rack assembly in a direction of movement out of said housing as said food-supporting rack assembly is moved from an internal cooking position to an outside-the-housing food inspection position.-

Signed and Sealed this

Twenty-seventh Day of March, 1990

Attest:

JEFFREY M. SAMUELS

Attesting Officer

Acting Commissioner of Patents and Trademarks